United States Patent [19]

Tezuka

[11] Patent Number: 4,747,003
[45] Date of Patent: May 24, 1988

[54] HEAD SHIFTING DEVICE FOR INFORMATION RECORDING AND/OR REPRODUCING APPARATUS

[75] Inventor: Nobuo Tezuka, Kanagawa, Japan

[73] Assignee: Canon Kabushiki Kaisha, Japan

[21] Appl. No.: 925,518

[22] Filed: Oct. 28, 1986

Related U.S. Application Data

[63] Continuation of Ser. No. 643,255, Aug. 22, 1984, abandoned.

[30] Foreign Application Priority Data

Aug. 23, 1983 [JP] Japan .................................. 58-153677
Aug. 23, 1983 [JP] Japan .................................. 58-153678

[51] Int. Cl.⁴ .............................. G11B 5/55; G11B 5/58
[52] U.S. Cl. ....................................... 360/106; 360/109
[58] Field of Search ................ 360/105, 106, 109, 97, 360/99, 98

[56] References Cited

U.S. PATENT DOCUMENTS

| | | | |
|---|---|---|---|
| 3,969,768 | 7/1976 | Ebbing | 360/106 |
| 4,131,923 | 12/1978 | Wachs et al. | 360/106 |
| 4,318,138 | 3/1982 | Osanai | 360/105 |
| 4,373,172 | 2/1983 | Motoyama et al. | 360/105 |

FOREIGN PATENT DOCUMENTS 548888 4/1977 U.S.S.R. ............................. 360/106

OTHER PUBLICATIONS

Holecek et al., "Archimedean Cam Actuator for Transducer," IBM Tech. Disclosure Bulletin, vol. 22, No. 9, Feb. 1980, pp. 4152–4154.
Arrington et al., "Transducer-Positioning Mechanism," IBM Technical Disclosure Bulletin, vol. 22, No. 12, May 1980, pp. 5232–5233.

Primary Examiner—John H. Wolff
Assistant Examiner—Matthew J. Bussan
Attorney, Agent, or Firm—Toren, McGeady & Associates

[57] ABSTRACT

A head shifting device having a movable head carriage mechanism which carries a head is movable to shift the head to a selected position on a record bearing medium. A moving mechanism which is arranged to move the head carriage mechanism is provided with a positioning device, and a restricting device is arranged to change its position in association with the movement of the head carriage mechanism and to restrict the head carriage mechanism at each of the moved positions thereof.

13 Claims, 6 Drawing Sheets

4,747,003

HEAD SHIFTING DEVICE FOR INFORMATION RECORDING AND/OR REPRODUCING APPARATUS

This is a continuation of application Ser. No. 643,255, filed Aug. 22, 1984, now abandoned.

BACKGROUND OF THE INVENTION

1. Field of the Invention

This invention relates to a head shifting device and more particularly to a head shifting device highly suited to a recording or reproducing apparatus for recording or reproducing information on or from a record bearing medium by shifting a recording or reproducing head to a selected position on the record bearing medium.

2. Description of the Prior Art

There have been known various, recording or reproducing apparatuses of the kind for recording or reproducing information on or from record bearing media such as rotary magnetic discs. In apparatus of this kind, a recording or reproducing position is shiftable by moving a transducing element such as a magnetic head relative to a record bearing medium. Arrangement to accomplish the shift of the recording or reproducing position, i.e. a head shifting operation, at a high speed with less energy greatly contributes to reduction either in the access time of the head required in carrying out information recording or reproduction or in the size of the apparatus and particularly that of a drive source. For that purpose, it is necessary to lessen the inertia of moving parts and their friction. To reduce the friction of the moving parts for that purpose, it has been the practice to use roller members for moving and guiding parts to smoothen the movement of the head carriage member.

In the case of a portable recording or reproducing apparatus, the apparatus tends to experience vibrations and shocks inflicted thereon during transportation. Then, such vibrations and shocks tend to affect the head carriage member and particularly the head carriage member having such a smoothening arrangement. Such vibrations tend to damage the head or the head positioning parts which would result in degraded recording or reproducing performance, tracking error of the head and the like.

SUMMARY OF THE INVENTION

It is therefore a principal object of the present invention to provide a novel head shifting device which is capable of solving the above-stated problem of the prior art devices.

It is another object of the invention to provide a novel head shifting device which is capable of preventing the vibration of a head carriage member even under vibrations and shocks inflicted thereon from outside, so that the head and the head positioning parts of the device can be effectively prevented from being damaged.

It is a further object of the invention to provide a head shifting device which not only contributes to reduction of size of the apparatus using the device but also permits accurate head shifting with simple structural arrangement.

Under these objects, a head shifting device embodying an aspect of the invention as a first embodiment thereof comprises movable head carriage means which carries a head and is movable to shift the head relative to a record bearing medium; a moving mechanism which is arranged to move the head carriage means and includes positioning means; and restricting means which is arranged to change its position in association with the movement of the head carriage means and to restrict the head carriage means at each of the moved positions of the head carriage means.

A head shifting device embodying an aspect of the invention as a second embodiment thereof comprises a head carriage means which is movable for shifting the head; cam means provided at the head carriage means; and driving means for driving the head carriage means through the cam means.

It is an additional object of the invention to provide a head shifting device which is arranged to use a record bearing medium container equipped with a counter arrangement and is highly suited to a recording or reproducing apparatus.

These and further objects and features of the invention will become apparent from the following detailed description of preferred embodiments thereof taken in connection with the accompanying drawings.

BRIEF DESCRIPTION OF THE DRAWINGS

Preferred embodiments of the invention are explained with reference to the accompanying drawings in which.

DETAILED DESCRIPTION OF THE PREFERRED EMBODIMENTS

Figure 1:
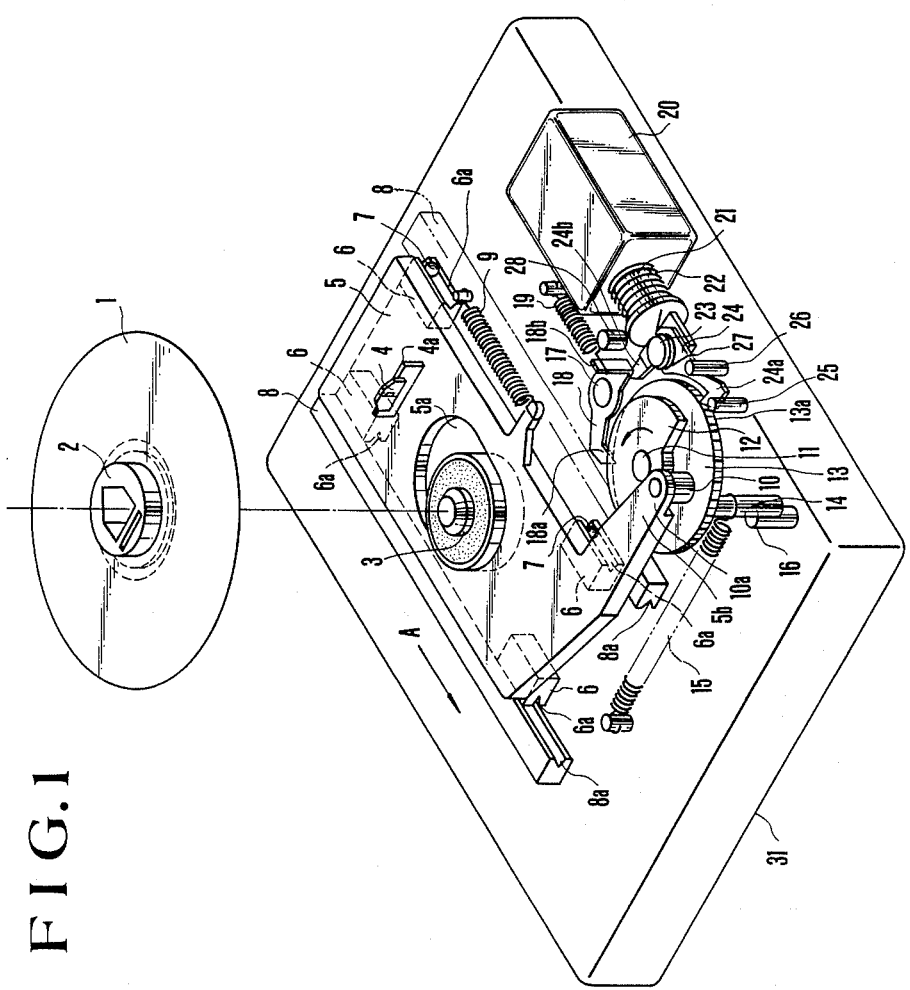
FIG. 1 is an oblique view showing by way of example a head shifting device and particularly the essential parts thereof related to the invention and arranged in a known recording or reproducing apparatus using a flexible rotary magnetic disc as the record bearing medium.

Head Shifting Device of Recording or Reproducing Apparatus proposed by the Prior Art:

FIG. 1 shows by way of example a head shifting device arranged in a known recording or reproducing apparatus using a flexible rotary magnetic disc as record bearing medium. The head shifting device of the prior art is provided with no protection against shocks. The illustration of FIG. 1 includes a flexible rotary magnetic disc 1 which is employed as the record bearing medium. The magnetic disc 1 is mounted at a center core 2 which is provided in the central part thereof on a magnetic disc rotating spindle 3 which is disposed on the side of the recording or reproducing apparatus. The spindle 3 is driven by a motor (not shown) to rotate the magnetic disc 1 at a predetermined speed. An information recording or reproducing magnetic head 4 is arranged to record or reproduce information on or from the magnetic disc 1. The magnetic head 4 is carried via a base plate 4a by a part of a head carriage 5. The head carriage 5 is provided with rail members 6 which have grooves 6a. The grooves 6a are of a "V" sectional shape and are disposed in four places. Guide rails 8 which are also provided with grooves 8a of a "V" sectional shape are disposed on a body chassis 31 of the recording or reproducing apparatus. The rail members 6 are opposed to the guide rails 8 with balls 7 interposed in between them at their grooves 6a and 8a. The head carriage 5 is thus arranged to be slidable in a direction of arrow A along the guide rails 8. The head 4 which is carried by the carriage 5 is therefore arranged to be shiftable in the radial direction of the magnetic disc 1. The carriage 5 is provided with an opening 5a for avoiding the spindle 3 and an extended arm 5b which has a cam follower roller 10 attached to the fore end thereof via a shaft 10a. A spring 9 is arranged to exert an urging force on the carriage 5 to urge it to move in a direction reverse to arrow A, so that the cam follower roller 10 abuts on a cam 12. The cam 12 forms a moving mechanism for the carriage 5 in conjunction with a ratchet wheel 13 which is arranged to drive the cam 12. The ratchet wheel 13 and the cam 12 are mounted on a rotation shaft 11 in one unified body. A pin 14 is disposed on the lower surface of the ratchet wheel 13 and is arranged to have the urging force of a spring 15 exerted via the pin 14 on the ratchet wheel 13 and the cam 12 to urge them to turn clockwise. An initial position determining stopper pin 16 is fixedly arranged to abut on the pin 14. A stop pawl member 18 is pivotally carried by a shaft 17 and is arranged to serve as cam position determining means, i.e. carriage position determining means, with a spring 19 urging it to turn counterclockwise. The fore end 18a of the stop pawl member 18 is arranged to stop the ratchet wheel 13 by engaging the ratchet teeth 13a provided in the periphery of the latter. A solenoid 20 is included in the carriage moving mechanism and is arranged to serve as cam driving means. The solenoid 20 is provided with a plunger 21. A shaft 23 is attached to the fore end part of the plunger 21 and is arranged to pivotally carry a driving pawl member 24 which serves as cam driving means. This driving pawl member 24 is urged by a spring 27 to turn clockwise while the fore end 24a thereof is arranged to engage ratchet teeth 13a formed in the periphery of the ratchet wheel 13. Pins 25 and 26 are arranged to restrict the movement of the driving pawl member 24. When the plunger 21 is attracted with the solenoid 20 energized, the driving pawl member 24 causes the ratchet wheel 13 to turn in the counterclockwise direction to an extent as much as one tooth pitch of the ratchet teeth 13a. A spring 22 is wound round the plunger 21 and is arranged to urge the plunger 21 to thrust forward in the direction for causing the driving pawl member 24 to abut on the restricting pin 25.

With the solenoid 20 energized, since the plunger 21 is drawn inward thereby, the driving pawl member 24 causes the ratchet wheel 13 to turn counterclockwise to the extent of one tooth pitch of the ratchet teeth 13a and to be stopped in that rotated position by the stop pawl member 18. The increment of the cam lift of the cam 12 which corresponds to the angle of the one tooth pitch rotation of the ratchet wheel 13 is arranged to be corresponding to one track pitch of recording tracks formed on the magnetic disc 1. Therefore, the head 4 is shifted by one track pitch every time the solenoid 20 is energized.

In bringing the head 4 back to its initial position, the apparatus operates as follows: In response to either an unloading or a loading of the magnetic disc 1, for example, a reset pin 28 is moved to the left as viewed on the drawing by suitable means (not shown). With the reset pin 28 moved to the left, the pin 28 pushes one end 18b of the stop pawl member 18 and one end 24b of the driving pawl member 24 to disengage these pawl members 18 and 24 from the ratchet wheel 13 respectively. Then, the spring 15 brings the cam 12 and the ratchet wheel 13 back to their initial positions where the pin 14 abuts on the pin 16. Then, the head carriage 5 is also brought by the force of the spring 9 back to its initial position shown in the drawings.

While the recording or reproducing apparatus is arranged in the manner as described above, if a shock is inflicted on the apparatus from outside in the moving direction of the head carriage 5 (in the direction of arrow A of the drawing), for example, impulsive vibrations of the head carriage would occur. Then, this would drive the cam follower roller 10 and the cam 12 apart from each other and then to collide against each other due to the urging force of the spring 9. Such collision tends to deform them and cause a change in the head shifting extent or precision. Further, if such impulsive vibrations are inflicted while the magnetic disc 1 is in a state of being in contact with the head 4, either the head 4 or the magnetic disc 1 might be damaged.

Figure 2:
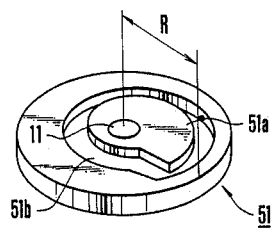
FIG. 2 is an oblique view showing by way of example a cam usable for controlling the head carriage member included in the apparatus of FIG. 1.

To prevent such accidents, it is conceivable to replace the cam 12 with a cam 51 which is arranged as shown in FIG. 2. The cam 51 is provided with a cam part 51a which is arranged in the same manner as the cam 12. However, the cam 51 includes a groove 51b which is arranged to receive the cam follower roller 10 therein. This arrangement, therefore, effectively prevents any impulsive move of the head carriage 5 even when an impulse or shock is inflicted from outside. However, a shortcoming of this arrangement lies in that the radius R of the cam 51 becomes too large for reduction in size of the whole apparatus. Besides, since the point at which the impulsive move is to be suppressed deviates from the center of gravity of the head carriage 5, it is another shortcoming of the arrangement that a moment develops at the head carriage 5 and this also tends to cause some deformation.

Figure 3:
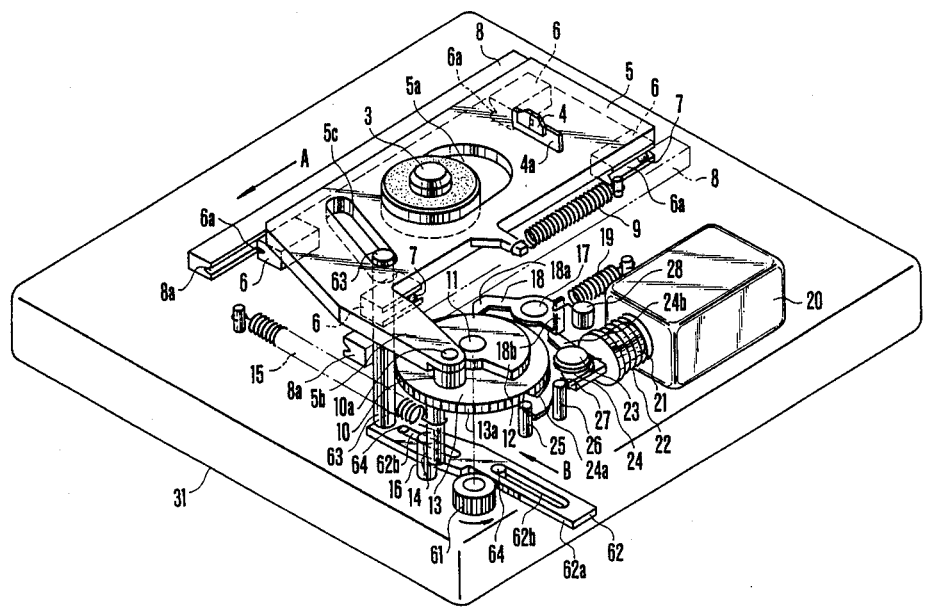
FIG. 3 is an oblique view showing a head shifting device embodying the invention as a first embodiment thereof.

First Embodiment of the Invention (FIG. 3):

FIG. 3 shows a head shifting device which is arranged according to the present invention as a first embodiment thereof to eliminate the above-stated shortcomings of the prior art. In FIG. 3, the members which are identical with those shown in FIG. 1 are indicated by the same reference numerals and omitted from the following description. In this embodiment, a pinion gear 61 is mounted on a rotation shaft 11 and is arranged to rotate together with the cam 12 and the ratchet wheel 13. The pinion gear 61 engages a rack part 62a of a restriction lever 62 which is arranged to serve as restricting means for the head carriage 5. The restriction lever 62 is provided with slots 62b and is movable in the direction of arrow B with pins 64 which is provided on the body chassis 31 engaging the slots 62b. The lever 62 is further provided with a restriction pin 63 which is disposed at the fore end of the lever 62. In addition to the arrangement shown in FIG. 1, the head carriage 5 which is carrying the head 4 is provided with a slanting slot 5c. The slot 5c is formed at a predetermined angle relative to the moving direction A of the head carriage 5. The restriction pin 63 which is provided on the restriction lever 62 is engaging with the slot 5c of the head carriage 5. The width of this slot 5c is somewhat larger than the diameter of the restriction pin 63. Therefore, the restriction pin 63 is movably engaged with the slot 5c.

As has been described with reference to FIG. 1 in the foregoing, when the head carriage 5 moves in the direction of arrow A with the cam 12 turning counterclockwise, the pinion gear 61 causes the restriction lever 62 to move in the direction of arrow B. Then, with the angle of the slot 5c relative to the moving direction of the carriage 5 appropriately determined according to the ratio of the direction of arrow A to the ratio of the direction of arrow B, the slot 5c and the restriction pin 63 are kept loosely engaged with each other. This arrangement effectively obviates the possibility of occurrence of such an undesirable condition that the movement of the head carriage 5 is hindered by the restriction pin 63.

In this embodiment, as mentioned above, the carriage 5 is provided with the slanting slot 5c which is arranged in combination with the restriction pin 63 to have the position of the pin 63 vary according as the carriage 5 moves. Therefore, when a shock is inflicted from outside on the recording or reproducing apparatus, the vibration of the carriage 5 is restricted to a very slight extent as the edge face of the slot 5c of the carriage 5 engages the restriction pin 63. Besides, in that event, the restricting point against the vibration of the carriage 5 is located quite close to the center of gravity of the carriage 5, so that the cam 12 and the cam follower 10 can be effectively prevented from being deformed or damaged by the shock inflicted from outside. Further, the rail members 6 and the guide rails 8 are also prevented from being affected by a particular moment, and a stable supporting of the carriage 5 can be obtained.

Figure 4:
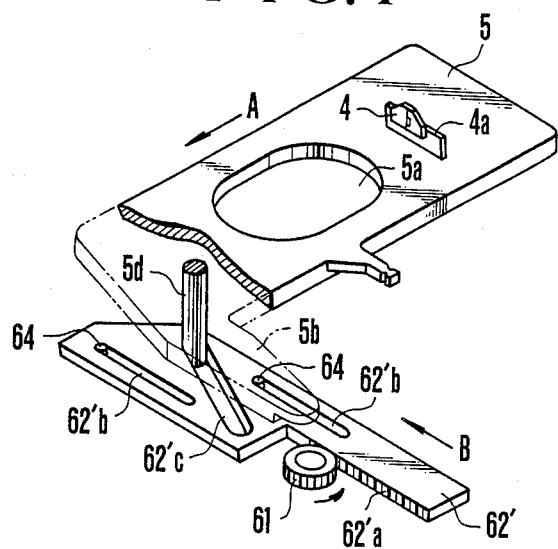
FIG. 4 is an oblique view of a modification of the embodiment of FIG. 3 showing the essential parts thereof differing from the arrangement shown in FIG. 3.

Modifications of First Embodiment (FIGS. 4 and 5):

In the embodiment shown in FIG. 3, the slanting or oblique slot 5c is formed in the head carriage 5 and the restriction pin 63 which is provided on the restriction lever 62 is arranged to loosely engage the slot 5c. However, this restricting relationship may be reversed, for example, in a manner as described below:

Referring to FIG. 4, a pin 5d is arranged to protrude from the lower surface of the head carriage 5. On the other hand, the restricting lever 62' has an oblique restricting slot 62'c which is slanting at a predetermined angle relative to the moving direction A of the carriage 5 and is arranged in the same manner as the slot 5c of the carriage 5 of FIG. 3. The pin 5d of the carriage 5 is engaged with the slot 62'c. The same effect as that of the embodiment of FIG. 3 is obtainable by this arrangement.

Figure 5:
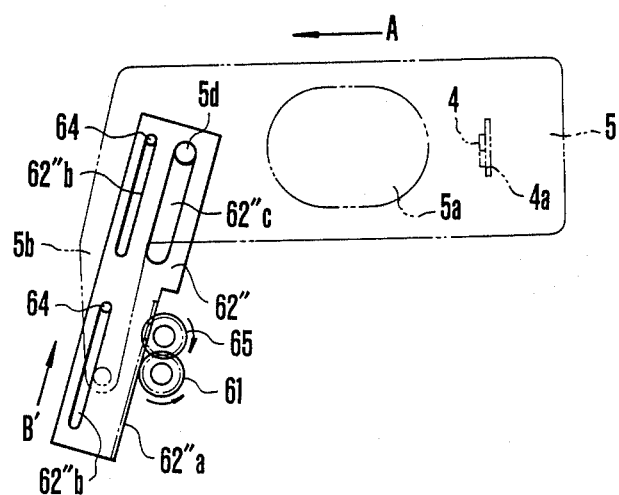
FIG. 5 is a plan view of another modification of the embodiment showing the essential parts differing from the arrangement shown in FIG. 3.

Further, referring now to FIG. 5, a restriction lever 62" which is provided with a restricting slot 62"c in a manner similar to the restricting slot 62'c may be arranged to be movable in the direction of arrow B' along this slot 62"c. In this case, the restriction lever 62" is provided with other slots 62"b which are arranged to have the pins 64 of the body chassis 31 engaged therewith. The lever 62" is further provided with a rack part 62"a which engages with a pinion gear 65. The pinion gear 65 engages with the pinion gear 61 and is arranged to move the restriction lever 62" in the direction of arrow B' when the pinion gear 61 rotates counterclockwise.

In the first embodiment and its modifications described above, the head is arranged to be shifted by a rotating cam which has its rotating phase controlled by a rotating ratchet mechanism. However, the head shifting cam in these cases may be of a linearly moving type instead of the rotating type. Further, in the first embodiment and its modifications described, the head shifting operation which is carried out by the cam may be arranged to be carried out by means of a feed screw which is arranged to be rotated by a motor to attain the same advantageous aspect of the invention as the first embodiment and its modifications described. In that instance, the feed screw part and other part that engages with the feed screw can be effectively prevented from being damaged by a shock inflicted on the apparatus from outside.

In the aspect of the invention embodied by the first embodiment and its modifications described in detail in the foregoing, when vibrations and shocks are inflicted from outside on the head shifting device of a recording or reproducing apparatus arranged to record or reproduce information by shifting a recording or reproducing head to a selected position on a record bearing medium, the head carrying member is prevented from vibrating, so that the head and the head positioning parts can be effectively protected against such shocks. Therefore, a novel head shifting device is obtainable in accordance with the arrangement described.

Second Embodiment of the Invention (FIGS. 6 to 8):

First, an example of a magnetic disc cassette which is equipped with a counter device and is usable for a recording or reproducing apparatus embodying the invention as a second embodiment thereof will be described with reference to FIG. 6.

Figure 6:
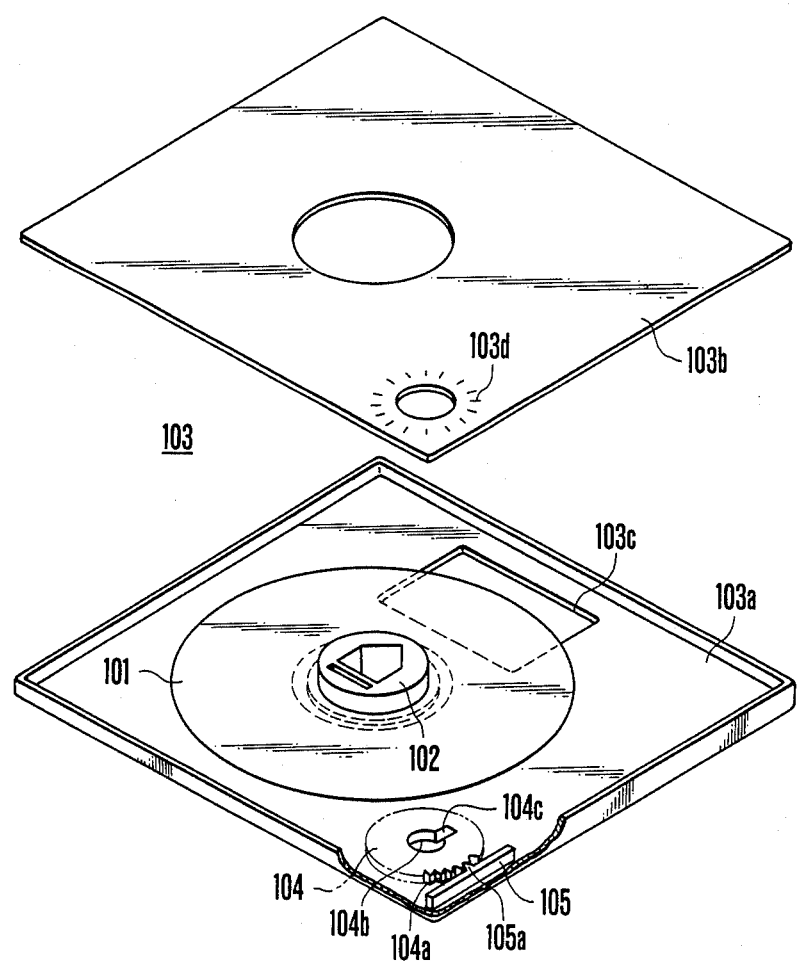
FIG. 6 an exploded oblique view showing by way of example a magnetic disc cassette of the kind having a counter.

Referring to FIG. 6, a reference numeral 101 denotes a flexible rotary magnetic disc. The disc 101 is provided with a center core 102 which is secured to the central part of the disc 1. The center core 102 is arranged to be mounted on a rotating spindle provided on the side of the recording or reproducing apparatus. The magnetic disc 101 is contained within a cassette 103. The cassette 103 consists of a lower casing 103a and an upper cover 103b. The lower casing 103a is provided with an opening 103c which is arranged to permit the head of the recording or reproducing apparatus to be inserted therein. A counter 104 is rotatably arranged within the cassette 103 and is provided with ratchet teeth 104a which is formed along its periphery.

In the central part of the counter 104 is provided a shaft hole 104b which has a key groove 104c. A counter holding elastic member 105 is provided with a claw 105a which is arranged to engage the ratchet teeth 104a of the counter 104.

The upper cover 103b of the cassette 103 is provided with an indicating graduation on scale 103d on which the key groove 104c of the counter indicates the head position.

In recording a signal with the recording apparatus which is arranged in the above-stated manner, concentric recording tracks are formed on the magnetic disc 101. The recording is performed on predetermined recording tracks. Meanwhile, in association with the shift of the recording head, counter driving means which is disposed on the side of the apparatus turns the counter 104. Then, the co-operation of the key groove 104c and the scale 103d indicates either the head position on the disc 101 or the number of the track on which the signal recording is next performed.

Figure 7:
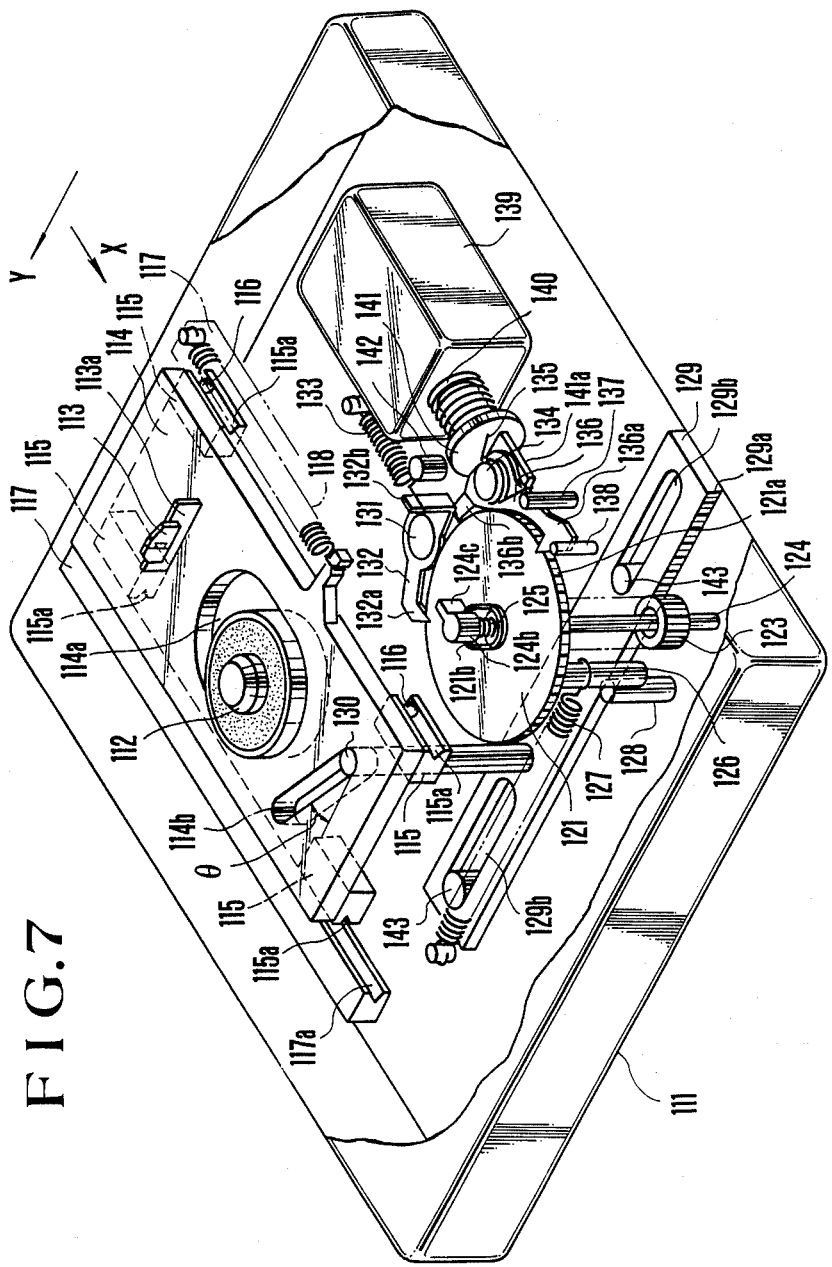
FIG. 7 is an oblique view showing a head shifting device arranged according to the invention as a second embodiment thereof and is disposed in a recording or reproducing apparatus using the cassette shown in FIG. 6.

Referring to FIG. 7, the second embodiment of the invention is shown in a recording or reproducing apparatus arranged to use the cassette shown in FIG. 6. The illustration of FIG. 7 includes the body chassis 111 of the recording or reproducing apparatus; a magnetic disc rotating spindle 112; a signal recording or reproducing magnetic head 113 which is secured to a part of a head carriage 114 via a mounting base plate 113a. Rail members having "V" shaped grooves 115a are mounted on the four corners of the head carriage 114. Guide rail members 117 which are likewise provided with "V" shaped grooves 117a are secured to a part of the body chassis 111 in parallel to the moving direction "x" of the head. The rail members 115 are opposed to the guide rail members 117 via balls 116 inserted in their "V" shaped grooves 115a and 117a. The arrangement is such that the head carriage 114 is movable along the guide rail members 117, i.e. in the direction of arrow "x". The head carriage 114 is provided with an opening 114a for avoiding the spindle 112 and a cam slot 114b which is arranged to engage with a pin 130. A spring 118 is arranged to urge the head carriage 114 to move in a direction reverse to the direction of arrow "x".

Figure 8:
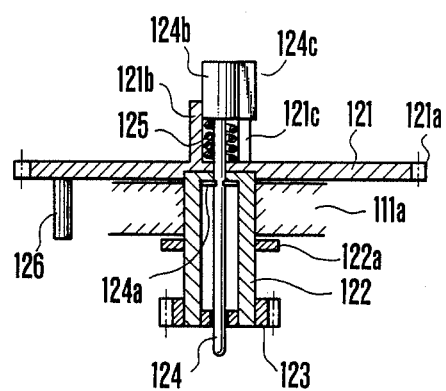
FIG. 8 is a sectional view showing a counter driving part arranged in the apparatus of FIG. 7.

A ratchet wheel 121 is provided with ratchet teeth 121a along the periphery thereof. Referring to FIG. 8, the ratchet wheel 121 has a cylinder member 122 attached to the lower surface thereof and is rotatably carried by a pivotally carrying part 111a of the body chassis 111 in a state of being prevented from being pulled out by a retaining ring 122a. A pinion gear 123 is mounted on the fore end of the cylinder member 122. A rod member 124 is arranged to extend through the inside of the cylinder member 122 and is restricted by a retaining ring 124a from moving upward. To the fore end part of the rod member 124 extending through the ratchet wheel 121 are attached a head part 124b and a key 124c which are arranged to engage with the shaft hole 104b and the key groove 104c of the counter 104 disposed in the cassette 103 shown in FIG. 6. A cylinder part 121b which has a slit 121c and is disposed on the upper surface of the ratchet wheel 121 is arranged to have the key 124c of the head part 124b of the rod member 124 engaged with the slit 121c and to permit the rod member 124 slidable up and down in that engaged state. A coiled spring 125 which is disposed within the cylinder part 121b urges the rod member 124 to move upward. By this arrangement, the rod member 124 and the ratchet wheel 121 are rotatable together.

Again referring to FIG. 7, a pin 126 is disposed at the lower surface of the ratchet wheel 121. A spring 127 is attached to the pin 126 and is arranged to urge the ratchet wheel 121 and the pinion gear 123 which is in one unified body with the ratchet wheel 121 to rotate together clockwise. Under the illustrated state, the pin 126 is abutting on a stopper pin 128 fixed provided on the body chassis 111. A head carriage driving lever 129 is provided with slots 129b which engage with fixed pins 143 provided on the body chassis 111. The driving lever 129 is thus arranged to be movable in the direction of arrow "y" which is perpendicular to the head shifting direction or the direction of arrow "x". The driving lever 129 is further provided with a rack part 129a which is arranged to engage with the pinion gear 123. A driving pin 130 which is provided on the driving lever 129 engages with the cam slot 114b of the head carriage 114 and is thus arranged to serve as head carriage driving member. A stop pawl member 132 is pivotally carried by a shaft 131 provided on the body chassis 111. The fore end part 132a of the stop pawl member 132 engages with the ratchet teeth 121a of the ratchet wheel 121 and the stop pawl member 132 is urged by a spring 33 to turn counterclockwise.

A solenoid 139 is arranged in combination with a plunger 141. The plunger 141 is provided with a shaft 134 which is disposed on a flat part 141a thereof. The shaft 134 pivotally carries a driving pawl member 136, which is urged to turn clockwise by a spring 135. The fore end part 136a of the driving pawl member 136 engages with the ratchet teeth 121a formed along the periphery of the ratchet wheel 121. The movement of the driving pawl member 136 is restricted by pins 137 and 138. When the solenoid 139 is not energized, the plunger 141 and the driving pawl member 136 are biased to the pin 138 by a spring 140.

When the cassette 103 shown in FIG. 6 is loaded on the cassette loading part of the body chassis 111, the center core 102 of the magnetic disc 101 is coupled with the spindle 112. The spindle 112 is then caused to rotate the magnetic disc 101 at a constant speed. A signal is recorded under this condition via the head 113.

Then, when a driving pulse is applied to the solenoid 139, the driving pawl member 136 and the locking pawl 132 cause the ratchet wheel 121 to turn counterclockwise to an extent as much as one tooth pitch of the ratchet teeth 121a. Further, the driving lever 129 is then moved by one step in the direction of arrow "y" by the rotation of the ratchet wheel 121 via the pinion gear 123. Assuming that the angle of the cam slot 114b provided in the head carriage 114 is $\theta$ relative to the direction of arrow "y", the head 113 then can be shifted stepwise by one track pitch in the direction of arrow "x", if the track pitch on the magnetic disc 101 is arranged to be tan $\theta$ as much as the above-stated stepwise move of the driving lever 129.

In this instance, if the head part 124b of the rod member 124 which rotates together with the ratchet wheel 121 has the phase of its key 124c coinciding with the key groove 104c of the counter 104 of the cassette 103, the head part 124b and the key 124c come to engage with the shaft hole 104b and the key groove 104c of the counter 104. Under that condition, therefore, the counter 104 indicates the head position or the number of the track on which signal recording is performed by turning counterclockwise every time the head 113 takes one step in its stepwise shift.

If the phase of the key 124c does not coincide with the key groove 104c of the counter 104 of the cassette 103, the head part 124b of the rod member 124 is pushed down by the lower surface of the counter 104 against the urging force of the spring 125. Thereby the rod member 124 rotates in vain and the counter 104 is not driven. And thereafter when the key 124c comes to coincide with the key groove 104c, the head part 124b and the key 124c come to engage with the shaft hole 104b and the key groove 104c, so that the counter 104 can be turned together with the stepwise movement of the head 113.

Further, an arrangement to detect the downward move of the lower end part of the rod member 124 which takes place when the key 124c does not coincide with the key groove 104c and to inhibit recording of the signal on the magnetic disc 101 then effectively prevents double recording.

The reset pin 142 is arranged to be moved in the direction of arrow "x" in response to a cassette taking out operation or the like. Then, this movement of the reset pin 142 pushes the tail end 132b of the stop pawl member 132 and the tail end 136b of the driving pawl member 136 to disengage them from the ratchet wheel 121. This disengagement then allows the urging forces of the springs 127 and 118 to bring the ratchet wheel 121, the driving lever 129 and the head carriage 114 back to their original positions respectively.

In accordance with the arrangement of this embodiment, as described above, the head can be accurately shifted despite the simple structural arrangement. The embodiment is suited for reduction in size and weight of the recording or reproducing apparatus. Further, the arrangement to move the head carriage by the combination of the cam slot provided in the head carriage and the driving pin completely obviates the possibility of having any part damaged by a shock inflicted from outside. These advantages can be obtained even for a recording or reproducing apparatus using a cassette of the type having a counter without complicating the structural arrangement thereof.

The aspect of the invention embodied by the second embodiment described in detail in the foregoing not only permits preparation of a head shifting device suited for reduction in size and weight but also permits a highly accurate head shifting operation with simple structural arrangement.

In both the first and second embodiments given, the invention is applied to the head shifting device of a recording or reproducing apparatus of the kind using a flexible rotary magnetic disc. However, the invention is applicable not only to the apparatus of that kind but also to other kinds using the record bearing medium of the optical, photo-magnetic or electrostatic capacity type of a record bearing medium of the rotary drum type.

What is claimed is:

1. In a recording or reproducing apparatus including a recording and/or reproducing head using a rotary type record bearing medium having a recording surface, a device for linearly and intermittently shifting said recording and/or reproducing head along the recording surface of the medium, comprising:
   (A) a head carriage for carrying said head, said carriage being linearly movable along a first axis to shift the head along the recording surface of the medium and having a cam slot formed along a second axis which forms a predetermined angle relative to said first axis;
   (B) an engaging member engaged with said cam slot of said head carriage; and
   (C) a drive mechanism for linearly moving said engaging member along a third axis which forms angles relative to said first and second axis so that the engaging member moves said head carriage through said cam slot.

2. A head shifting device comprising:
   head means for recording and/or reproducing a signal to or from a record bearing medium and carriage means for carrying said head means, said carriage means being movable to shift said head means;
   a moving mechanism for moving said carriage means, said moving mechanism including positioning means for positioning said carriage means at each moved position thereof; and
   restriction means movable in response to said moving mechanism for restricting movement of said carriage means at each moved position thereof; said carriage means being linearly movable along a first axis and having a slot along a second axis which forms a predetermined angle relative to said first axis, said restriction means including an engaging member engaged with said slot of said carriage means and a moving member for moving said engaging member within said slot in response to said moving mechanism.

3. A head shifting device comprising:
   head means for recording and/ or reproducing a signal to or from a record bearing medium and carriage means for carrying said head means, said carriage means being movable to shift said head means;
   a moving mechanism for moving said carriage means, said moving mechanism including positioning means for positioning said carriage means at each moved position thereof; and
   restriction means movable in response to said moving mechanism for restricting movement of said carriage means at each moved position thereof;
   said carriage means being linerarly movable along a first axis and having an engaging member, said restriction means including a movable member movable in response to said moving mechanism and having a slot along a second axis, said movable member being arranged so that said second axis forms a predetermined angle relative to said first axis, said engaging member of said carriage means being engaged with said slot.

4. In recording or reproducing apparatus including a recording and/or reproducing head using a rotary type record bearing medium having a recording surface, a device for linearly and intermittently shifting said recording and/or reproducing head along the recording surface of the medium, comprising:
   a head carriage for carrying said head, said carriage being linearly movable to shift the head along the recording surface of the medium;
   a cam for moving said head carriage;
   a ratchet mechanism for intermittently driving said cam; and
   restriction means for restricting movement of said head carriage at each moved postion thereof, said restriction means being operatively connected with said ratchet mechanism and movable in response thereto;
   said head carriage being movable along a first axis and having a slot along a second axis which forms a predetermined angle relative to said first axis, said restriction means including an engaging member engaged with said slot of said head carriage and a moving member for moving said engaging member within said slot in response to said ratchet mechanism.

5. In recording or reproducing apparatus including a recording and/or reproducing head using a rotary type record bearing medium having a recording surface, a device for linearly and intermittently shifting said recording and/or reproducing head along the recording surface of the medium, comprising:
   a head carriage for carrying said head, said carriage being linearly movable to shift the head along the recording surface of the medium;
   a cam for moving said head carriage;

a ratchet mechanism for intermittently driving said cam; and restriction means for restricting movement of said head carriage at each moved position thereof, said restriction means being operatively connected with said ratchet mechanism and movable in response thereto;

said head carriage being movable along a first axis and having an engaging member, said restriction means including a movable member movable in response to said ratchet mechanism and having a slot along a second axis, said movable member being arranged so that said second axis forms a predetermined angle relative to said first axis, said engaging member of said head carriage being engaged with said slot.

6. An apparatus having a transducer head, comprising:
(a) a head carriage having said transducer head placed thereon and being supported in a freely movable manner in a first direction on a chassis for moving said head along a recording plane of a recording medium.
(b) a cam for controlling a movement of said head carriage in the first direction, said cam forming at its external circumference a cam surface for engaging an engaging part of said head carriage; and
(c) restricting means being provided in a freely movable manner in a second direction, different from said first direction and cooperating with said head carriage via camming engagement, for restricting the movement of said head carriage in said first direction against said chassis at each one of respective moving positions of said head carriage.

7. An apparatus having a transducer head, comprising:
(a) a head carriage for carrying said transducer head in a first direction;
(b) driving means for driving said head carriage in said first direction, said driving means having a cam which forms, at an external side plane, an outer cam face engaging with said head carriage for driving the head carriage by driving said cam;
(c) restricting means, moving in a second direction, different from said first direction, and cooperating with said head carriage via camming engagement, for restricting the movement of said head carriage in said first direction at each moving position of said head carriage.

8. An apparatus according to claim 7, wherein said transducer head is a recording head.

9. An apparatus according to claim 7, wherein said transducer head is a reproducing head.

10. An apparatus according to claim 7, wherein said transducer head is both a recording and reproducing head.

11. An apparatus according to claim 7, wherein said driving means includes a motor for rotating said cam.

12. An apparatus according to claim 11, wherein said carriage has an engaging member which contacts with said outer cam face.

13. An apparauts according to claim 11, wherein said head carriage has a slot and said restricting means includes;
(a) a pin engageable with said slot of said head carriage,
(b) a gear rotatable in association with said outer cam face and
(c) a member engageable with said gear and having said pin thereon.

* * * * *